US010880825B1

(12) United States Patent
Taneja et al.

(10) Patent No.: US 10,880,825 B1
(45) Date of Patent: Dec. 29, 2020

(54) INFRASTRUCTURE AIDED NEIGHBOR AWARENESS NETWORKING FOR 802.11AX AND MIXED MODE NETWORKS

(71) Applicant: Cisco Technology, Inc., San Jose, CA (US)

(72) Inventors: Mukesh Taneja, Bangalore (IN); Sudhir K. Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/543,427

(22) Filed: Aug. 16, 2019

(51) Int. Cl.
*H04W 48/16* (2009.01)
*H04L 5/00* (2006.01)
*H04W 84/12* (2009.01)

(52) U.S. Cl.
CPC ............. *H04W 48/16* (2013.01); *H04L 5/003* (2013.01); *H04W 84/12* (2013.01)

(58) Field of Classification Search
None
See application file for complete search history.

(56) References Cited

U.S. PATENT DOCUMENTS

| 10,129,900 B2 | 11/2018 | Park et al. | |
| 10,313,961 B2 * | 6/2019 | Jung | H04W 48/16 |
| 2015/0109981 A1 * | 4/2015 | Patil | H04L 67/1078 |
| | | | 370/311 |
| 2016/0029403 A1 | 1/2016 | Roy et al. | |
| 2016/0165653 A1 * | 6/2016 | Liu | H04L 67/325 |
| | | | 370/329 |
| 2016/0286574 A1 * | 9/2016 | Abraham | H04L 63/062 |
| 2016/0323925 A1 * | 11/2016 | Alanen | H04W 8/005 |
| 2016/0353470 A1 | 12/2016 | Liu et al. | |
| 2017/0085461 A1 * | 3/2017 | Zhou | H04L 45/02 |
| 2017/0289994 A1 | 10/2017 | Kim et al. | |
| 2018/0242241 A1 * | 8/2018 | Tsai | H04W 40/244 |
| 2019/0297525 A1 * | 9/2019 | Keragodu Surya Prakash ............ |
| | | | H04W 28/0284 |
| 2019/0357214 A1 * | 11/2019 | Kurian | H04W 72/02 |

FOREIGN PATENT DOCUMENTS

WO 2016190721 A1 12/2016

OTHER PUBLICATIONS

Neighbor Awareness Networking Specification Version 3.0, 2018 Wi-Fi Alliance, 204 pages.

* cited by examiner

*Primary Examiner* — Otis L Thompson, Jr.
(74) *Attorney, Agent, or Firm* — Patterson + Sheridan, LLP

(57) ABSTRACT

Techniques for routing data in a wireless communication network including a hybrid of infrastructure wireless local area network (WLAN) and neighbor awareness networking (NAN) are described. An access point (AP) allocates at least one radio sub-channel for NAN data transmission in the wireless communication network. A NAN beacon that identifies the allocated radio sub-channel is transmitted from the AP to a first NAN device. The first NAN device is configured to transmit a NAN network message to a second NAN device using the allocated radio sub-channel based on receiving the NAN beacon.

20 Claims, 19 Drawing Sheets

| TRIGGER TYPE SUBFIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NPD FEEDBACK REPORT POLL (NFRP) |
| 8-15 | RESERVED |

FIG. 7A

INFRASTRUCTURE AIDED NEIGHBOR AWARENESS NETWORKING FOR 802.11AX AND MIXED MODE NETWORKS

TECHNICAL FIELD

Embodiments presented in this disclosure relate generally to wireless networking, and more specifically, though not exclusively, to data communication and network resource management in 802.11ax infrastructure wireless local area networks (WLAN) and neighbor awareness networking (NAN) networks.

BACKGROUND

Many existing wireless networks operate using an infrastructure wireless local area network (WLAN) architecture, in which a network access point (AP) is used to facilitate wireless communication between wireless stations (e.g., end user devices). Infrastructure WLAN is also sometimes referred to as infrastructure basic server set (BSS). Alternative network architectures are becoming more and more common, including device-to-device (D2D) networks. One example of a D2D network is a neighbor awareness network (NAN). NAN allows device-to-device wireless communication, without requiring the support of WLAN infrastructure nodes like APs.

Some networks operate as a hybrid, including both aspects of infrastructure WLAN (e.g., using APs) and aspects of NAN (e.g., device-to-device communication, without use of an AP, for some network nodes). These networks, however, are often inefficient in their data communication and use of network resources. It is desirable to improve data communication and resource management in these hybrid networks to take advantage of the technologies provided both by infrastructure-WLAN and NAN.

Further, 802.11ax is an emerging wireless communication standard with a variety of new features. Hybrid infrastructure-WLAN and NAN networks can be improved by taking advantage of improvements and new features offered by 802.11ax. In addition, further wireless communication standards beyond 802.11ax are expected to be released, including even further new features.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 7A-7B illustrate a trigger in an 802.11ax infrastructure-WLAN and NAN network, according to one embodiment described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
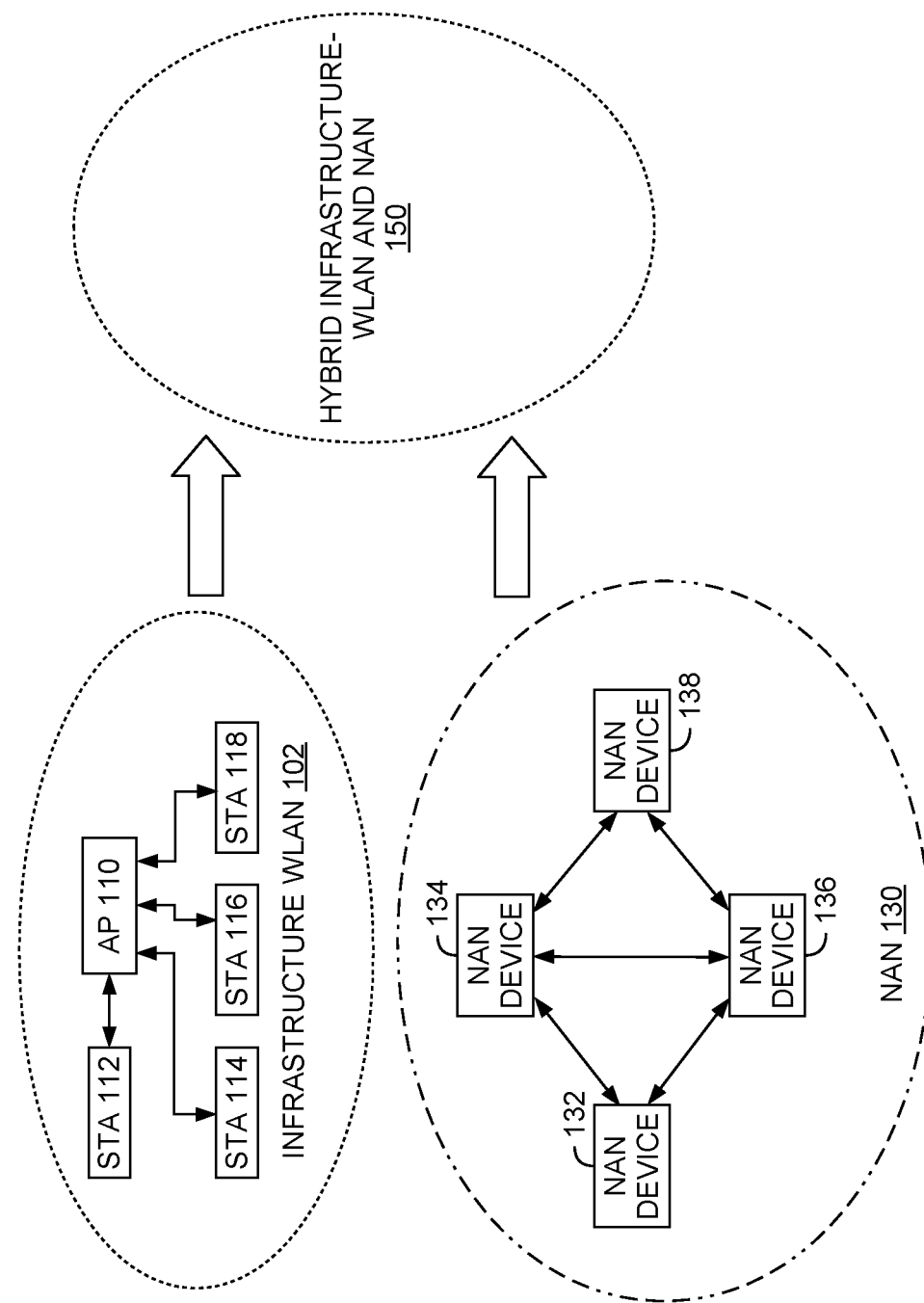
FIGS. 1A-1B illustrate a hybrid infrastructure-WLAN and NAN network, according to one embodiment described herein.

Embodiments described herein include a method for routing data in a wireless communication network including a hybrid of infrastructure wireless local area network (WLAN) and neighbor awareness networking (NAN). The method includes allocating, by an access point (AP), at least one radio sub-channel for NAN data transmission in the wireless communication network. The method further includes transmitting a NAN beacon that identifies the allocated radio sub-channel from the AP to a first NAN device. The first NAN device is configured to transmit a NAN network message to a second NAN device using the allocated radio sub-channel based on receiving the NAN beacon.

Embodiments described herein further include a computer program product for routing data in a wireless communication network including a hybrid of infrastructure wireless local area network (WLAN) and neighbor awareness networking (NAN). The computer program product includes a computer-readable storage medium having computer-readable program code embodied therewith, the computer-readable program code executable by one or more computer processors to perform an operation. The operation includes allocating, by an access point (AP), at least one radio sub-channel for NAN data transmission in the wireless communication network. The operation further includes transmitting a NAN beacon that identifies the allocated radio sub-channel from the AP to a first NAN device. The first NAN device is configured to transmit a NAN network message to a second NAN device using the allocated radio sub-channel based on receiving the NAN beacon.

Embodiments described herein further include a system, including a processor and a memory storing a program, which, when executed on the processor, performs an operation. The operation includes allocating, by an access point (AP), at least one radio sub-channel for NAN data transmission in a wireless communication network. The operation further includes transmitting a NAN beacon that identifies the allocated radio sub-channel from the AP to a first NAN device. The first NAN device is configured to transmit a NAN network message to a second NAN device using the allocated radio sub-channel based on receiving the NAN beacon.

Example Embodiments

Device-to-device (D2D) networks allow for device-to-device wireless communication without the use of infrastructure nodes, like APs. For instance, NAN is one example of a D2D network. The disclosure herein will focus on NAN as one example of a D2D network, but the described techniques are equally applicable to other D2D networks. Current versions of NAN allow for integration with infrastructure WLAN, but do not take advantage of APs or other infrastructure elements. Data communication and resource management in hybrid infrastructure-WLAN and NAN networks can be improved with a variety of enhancements, as described in one or more embodiments disclosed herein.

For example, NAN data transmission can be routed through an infrastructure WLAN AP, in certain circumstances, to improve the efficiency of data communication in hybrid infrastructure-WLAN and NAN networks. As another example, resource management in hybrid infrastructure-WLAN and NAN networks can be improved through enhancements to messaging between NAN devices and infrastructure WLAN APs.

Further, 802.11ax offers a variety of new features. For example, 802.11ax allows for the use of radio sub-channels (e.g., resource units) for communication using Orthogonal Frequency-Division Multiple Access (OFDMA). In an 802.11ax network, an AP may allocate radio sub-channels (e.g., resource units) to stations (STAs) and may serve multiple users at the same time. These new features can be used to improve communication and resource allocation in hybrid infrastructure-WLAN and NAN networks, where at least some of the devices support 802.11ax. In addition, wireless communication specifications beyond 802.11ax (such as 802.11be) are likely to be released. New features in these beyond 802.11ax networks can also be used to improve communication and resource allocation in hybrid infrastructure-WLAN and NAN networks.

Figure 1B:
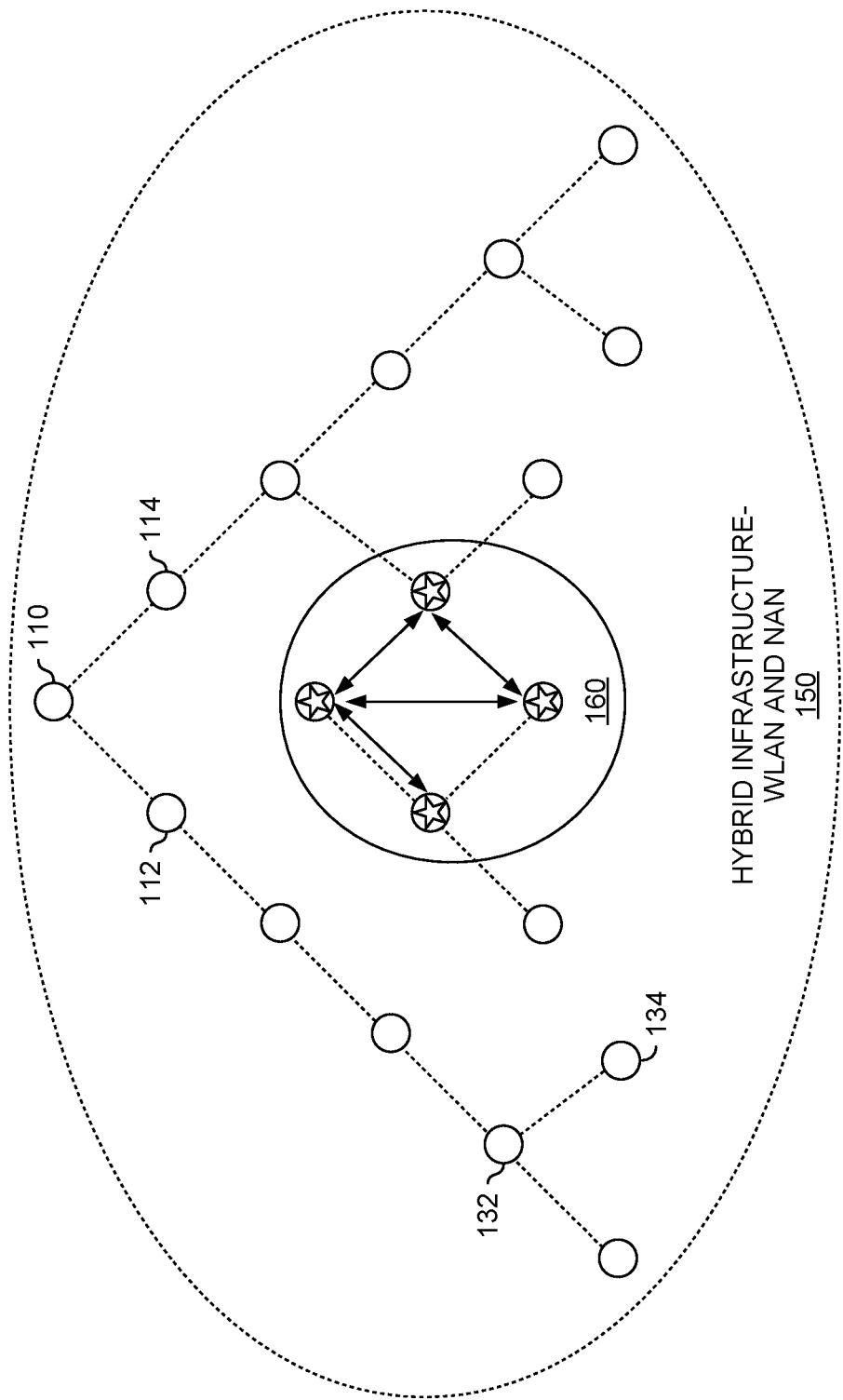

FIGS. 1A-1B illustrate a hybrid infrastructure-WLAN and NAN network, according to one embodiment described herein. In FIG. 1A, an infrastructure WLAN network 102 includes an AP 110 and four STAs 112, 114, 116, and 118. In an embodiment, the STAs 112, 114, 116, and 118 can be any suitable wireless network station, including a laptop or desktop computer, a workstation or server, a smartphone, a tablet, an Internet of Things (IoT) device, or any other suitable STA. The AP 110 is wirelessly connected to each of the STAs 112, 114, 116, and 118 using a suitable wireless network connection, including WLAN (e.g., an 802.11ax connection), or any other suitable wireless technology.

As illustrated in FIG. 1A, a NAN network 130 includes four NAN devices 132, 134, 136, and 138. In an embodiment, the NAN devices 132, 134, 136, and 138 can also be any suitable wireless network station, including a laptop or desktop computer, a workstation or server, a smartphone, a tablet, an Internet of Things (IoT) device, or any other suitable NAN device. The NAN devices 132, 134, 136, and 138 are wirelessly connected to each other using a suitable wireless network connection, including WiFi (e.g., an 802.11ax connection), or any other suitable wireless technology. In an embodiment, the infrastructure WLAN network 102 is combined with the NAN network 130 to form a hybrid infrastructure-WLAN and NAN network 150.

FIG. 1B illustrates the hybrid infrastructure-WLAN and NAN network 150 in more detail. In an embodiment, an AP 110 is wirelessly connected to STAs 112 and 114. The STAs 112 and 114 are associated both with the AP 110 and with NAN devices. For example, the STAs 112 and 114 are both associated with the AP 110, and the STAs 112 and 114 can communicate with one or more devices of NAN data cluster 160, either directly or via other devices illustrated in FIG. 1B. The NAN data cluster 160 is made up of NAN devices, none of which are directly connected with the AP 110. The hybrid infrastructure-WLAN and NAN network 150 further includes NAN devices 132 and 134 which are wirelessly connected to each other, but are not directly connected to the AP 110 or the STAs 112 and 114.

Figure 2:
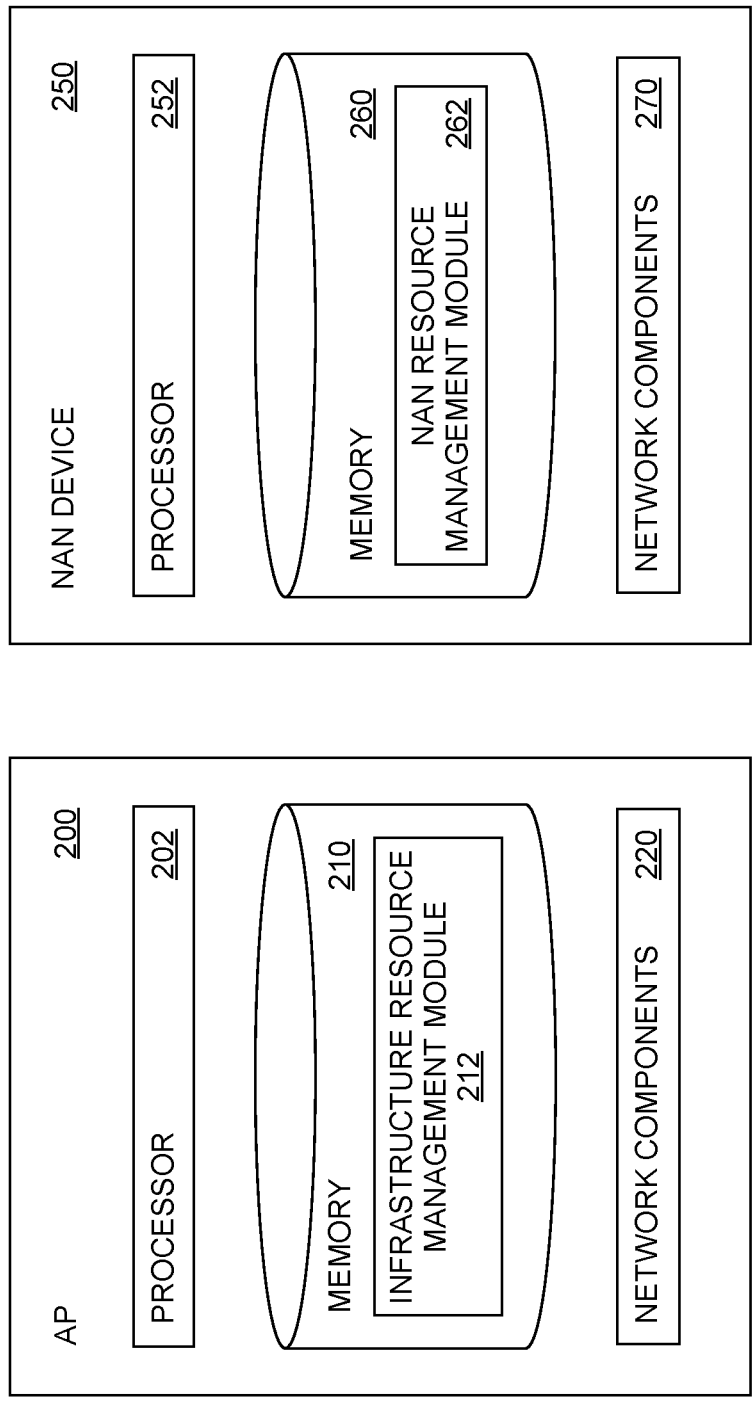
FIG. 2 is a block diagram illustrating an AP and a NAN device in a hybrid infrastructure-WLAN and NAN network, according to one embodiment described herein.

FIG. 2 is a block diagram illustrating an AP 200 and a NAN device 250 in a hybrid infrastructure-WLAN and NAN network, according to one embodiment described herein. The AP 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the AP 200 to interface with a wireless communication network, as discussed above in relation to FIGS. 1A-1B. For example, the network components 220 can include WiFi or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the AP 200. The program code is generally described as various functional "applications" or "modules" within the memory 210, although alternate implementations may have different functions and/or combinations of functions. Within the memory 210, the infrastructure resource management module 212 manages data transmission and resource management for the AP and some of the end-devices (e.g., belonging to an infrastructure WLAN or NAN network) in a hybrid infrastructure-WLAN and NAN network, as discussed further in relation to FIG. 3 and after.

The NAN device 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the NAN device 250 to interface with a wireless communication network, as discussed above in relation to FIGS. 1A-1B. For example, the network components 270 can include WiFi or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the NAN device 250. The program code is generally described as various functional "applications" or "modules" within the memory 260, although alternate implementations may have different functions and/or combinations of functions. Within the memory 260, the NAN resource management module 262 manages data transmission and resource management for the NAN device in a hybrid infrastructure-WLAN and NAN network, as discussed further in relation to FIG. 3 and after.

Figure 3A:
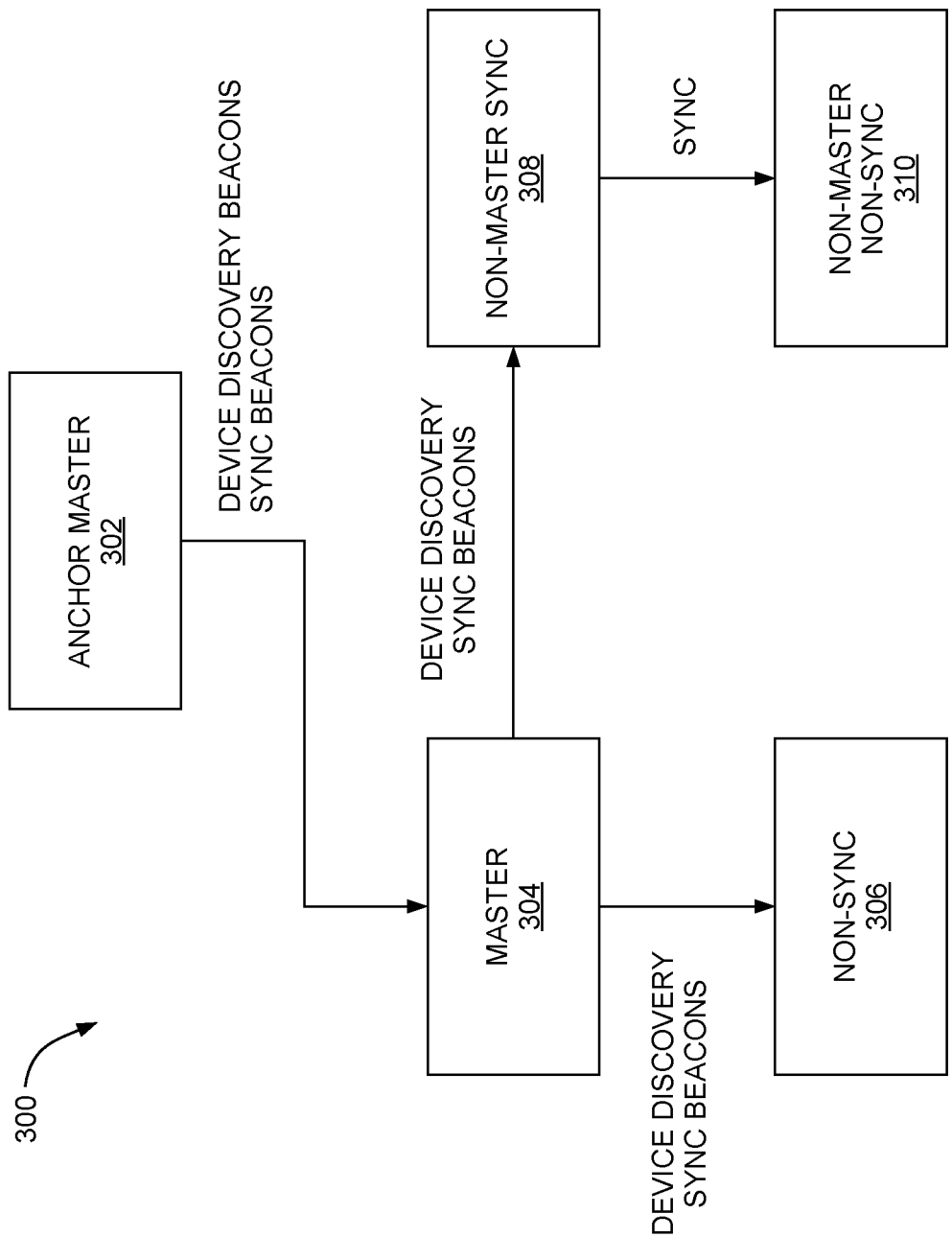
FIGS. 3A-3B illustrate a NAN network, according to one embodiment described herein.

FIG. 3A illustrates a NAN network, according to one embodiment described herein. As discussed above, NAN facilitates device-to-device communication without requiring infrastructure nodes like APs. NAN is sometimes referred to as Wi-Fi Aware. The term NAN is used herein for convenience, but the techniques disclosed apply equally to both NAN and WiFi-Aware, and to any other suitable device-to-device communication architectures (e.g., proprietary architectures from device or system manufacturers, other device-to-device standards, etc.).

In an embodiment, a NAN network 300 includes an anchor master device 302, a master device 304, a non-sync device 306, a non-master sync device 308, and a non-master, non-sync device 310. The NAN network 300 uses a number of beacons, including discovery beacons to help discover NAN clusters, synchronization beacons used for timing synchronization, service discovery beacons used to help discovery of available services. In an embodiment, NAN does not mandate a particular data plane, allowing numerous potential options to be used. Further details regarding NAN are provided in the Neighbor Awareness Network Specification, available from the Wi-Fi alliance.

As illustrated in FIG. 3A, the anchor master device 302 transmits discovery and sync beacons to other devices in the NAN network 300. The master device 304 propagates NAN discovery and synchronization beacons. The non-master sync device 308 propagates synchronization beacons. The non-master non-sync device 310 does not propagate any of these beacons.

Figure 3B:
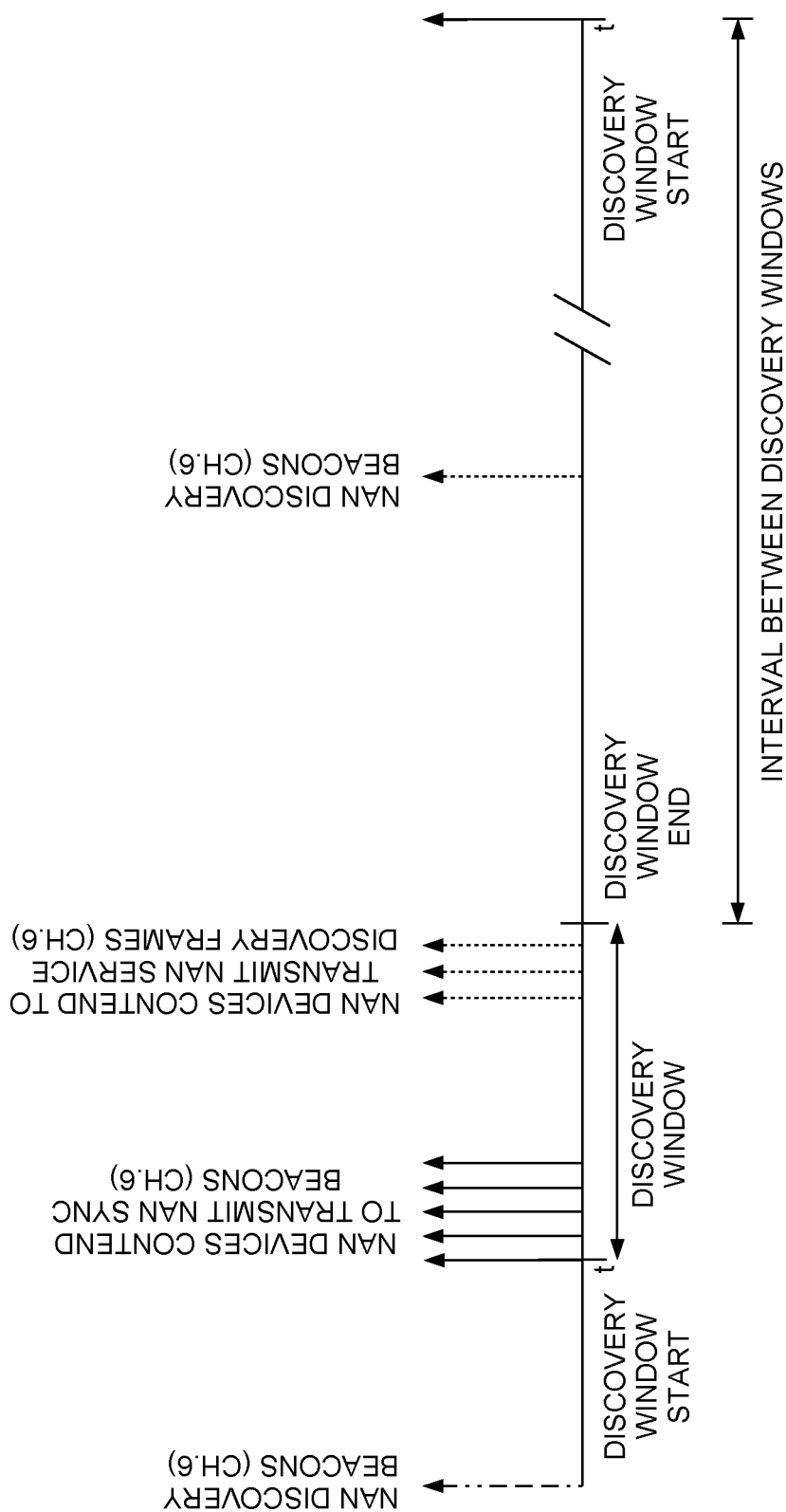

FIG. 3B illustrates discovery messaging in a NAN network, according to one embodiment described herein. In an embodiment, discovery of NAN clusters happens through passive scanning in the NAN discovery channels. For example, in 2.4 GHz band communication, the NAN discovery channel is typically channel 6. As another example, in 5 GHz communication the NAN discovery channels are typically channels 44 and 149. Alternatively, NAN devices may be discovered through beacon or probe response frames that carry a NAN information element (IE).

As illustrated in FIG. 3B, NAN devices typically transmit NAN discovery beacons (e.g., over channel 6) to facilitate discovery of NAN clusters and related attributes. In an embodiment, the discovery window is approximately 16 ms. This is merely one example, and other intervals can be used. During the discovery window, NAN devices first contend to transmit NAN sync beacons (e.g., again over channel 6). The NAN devices then contend to transmit NAN service discovery frames before the end of the discovery window.

In an embodiment, an interval of time occurs between discovery windows. During this time, NAN devices again transmit NAN discovery beacons (e.g., again over channel 6). In an embodiment, the interval between discovery windows is approximately 524 ms. This is merely one example, and other intervals can be used. The next discovery window then starts, and the process is repeated. In an embodiment, a NAN device is not allowed to transmit data during a discovery window.

In an embodiment, multiple NAN devices transmit discovery beacons during the interval between discovery windows. For example, each NAN device in a master role may transmit discovery beacons between discovery windows, to facilitate discovery of NAN clusters. In this example, a NAN device in a non-master role typically does not transmit discovery beacons regularly, but may transmit discovery beacons for a short duration of time to facilitate rapid convergence of NAN clusters. Further, in an embodiment, a network may include several NAN clusters and multiple discovery windows.

This can result in a variety of performance issues. For example, in prior solutions a separate channel is needed for NAN communication (e.g., for the NAN control and management plane). In hybrid infrastructure-WLAN and NAN networks, this can result in performance issues if the same channel is used for NAN communication (e.g., between NAN devices in the NAN cluster 160 illustrated in FIG. 1B) and infrastructure communication (e.g., between AP 110 and a NAN device in the NAN cluster 160, as illustrated in FIG. 1B).

For example, this can cause delay in the infrastructure network because of the channel bandwidth dedicated to NAN communication. This can be particularly problematic for delay-sensitive applications, like video conferencing. As another example, this can cause collisions between beacons from the infrastructure devices (e.g., APs) and discovery beacons from NAN devices. This can be particularly problematic for denser networks with a higher number of NAN devices.

Figure 4A:
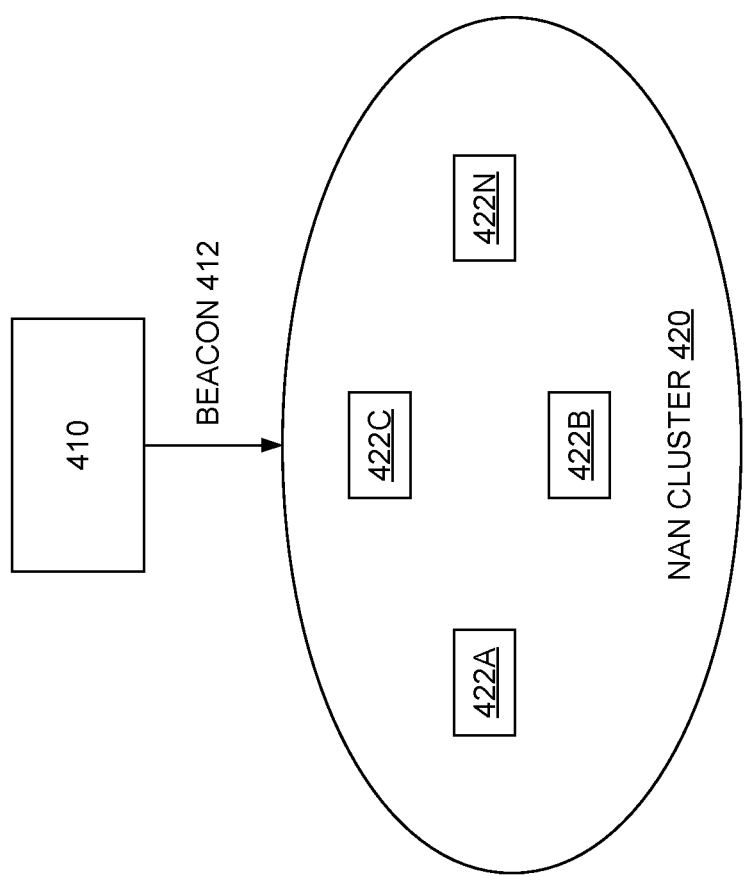
FIGS. 4A-4B illustrate informing NAN devices of resource allocation using beacons, in an 802.11ax infrastructure-WLAN and NAN network, according to one embodiment described herein.
Figure 4B:
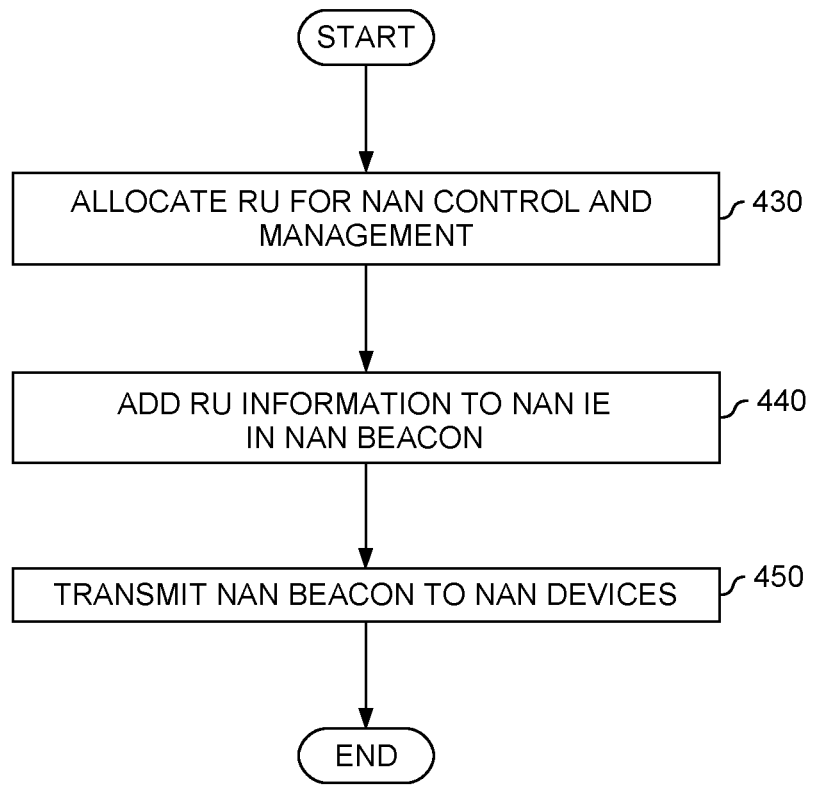

FIGS. 4A-4B illustrate informing NAN devices of resource allocation using beacons, in an 802.11ax infrastructure-WLAN and NAN network, according to one embodiment described herein. Infrastructure networks supporting 802.11ax, and beyond (such as 802.11be), allow for sub-channels using OFDMA. These sub-channels are typically referred to as resource units (RUs). For example, wireless transmission can use an RU of approximate bandwidth 2 MHz or 4 MHz for communication, instead of wider channels used in earlier wireless technologies. An AP can allocate RUs to STAs, and can serve multiple users at the same time. In an embodiment, this can apply both to sending uplink data from an STA to an AP, and to sending downlink data from an AP to an STA.

FIG. 4A illustrates beacons between an AP and a NAN device in a network in which each device supports the sub-channel functionality of 802.11ax wireless networks. In an embodiment, an AP can assign a radio sub-channel (e.g., an RU), instead of a full channel, for the NAN control and management plane. This RU can be used for NAN discovery beacons, NAN synchronization beacons, NAN service discovery frames, and NAN action frames. Using an RU instead of a full channel can alleviate many of the performance issues described above.

As discussed above, in an embodiment, an AP may assign the RU to be used by the NAN control and management plane. As illustrated in FIG. 4A, the AP may inform NAN devices about the RU by including it in a NAN IE in beacons from the AP to the NAN devices. An attribute may be added to indicate the assigned RU for NAN control and management plane procedures. Further, the beacon can indicate an activation time for usage of the RU.

For example, as illustrated in FIG. 4A an AP 410 can transmit a beacon 412 to one or more of the NAN devices 422A-N in the NAN cluster 420. This beacon can include a NAN IE indicating the RU to be used for NAN control and management plane procedures. Usage of a NAN IE is merely one example, and other suitable network messaging could be used.

FIG. 4B is a flowchart illustrating informing NAN devices of RU allocation using NAN beacons, according to one embodiment described herein. At block 430, an AP (e.g., the AP 410 illustrated in FIG. 4A) allocates the RU to be used for NAN control and management plane procedures. In an embodiment, the AP assigns the RU. Alternatively, another suitable network component (e.g., a network controller) can assign the RU.

At block 440, the AP adds the RU information (e.g., identifying the allocated RU) to a NAN IE in a NAN beacon. At block 450, the AP transmits the NAN beacon to NAN devices (e.g., one or more of the NAN devices 422A-N in the NAN cluster 420, illustrated in FIG. 4A).

Figure 5A:
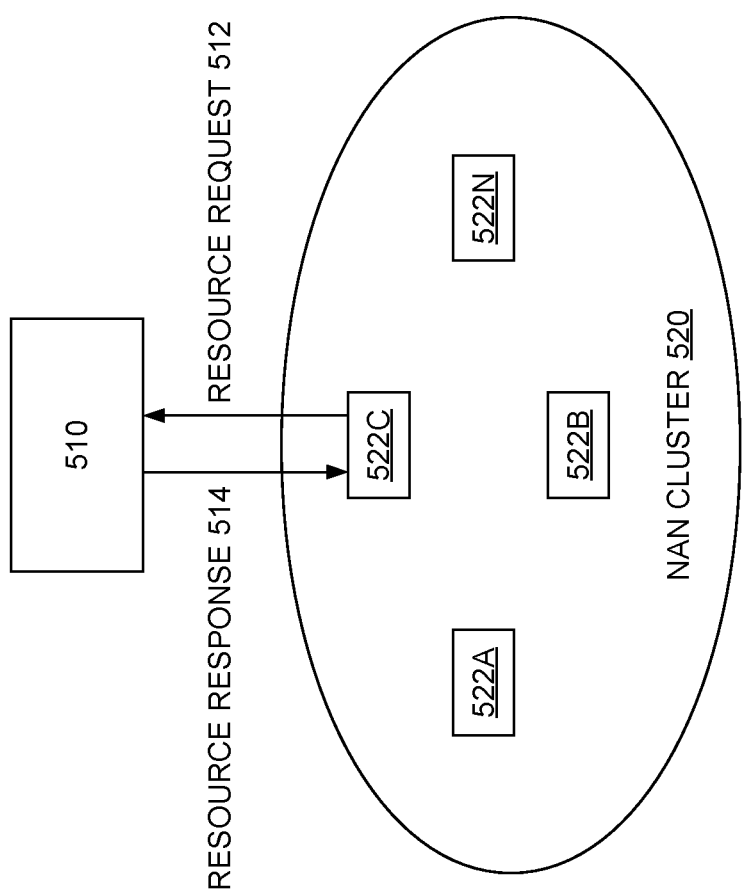
FIGS. 5A-5B further illustrate informing NAN devices of resource allocation using beacons, in an 802.11ax infrastructure-WLAN and NAN network, according to one embodiment described herein.
Figure 5B:
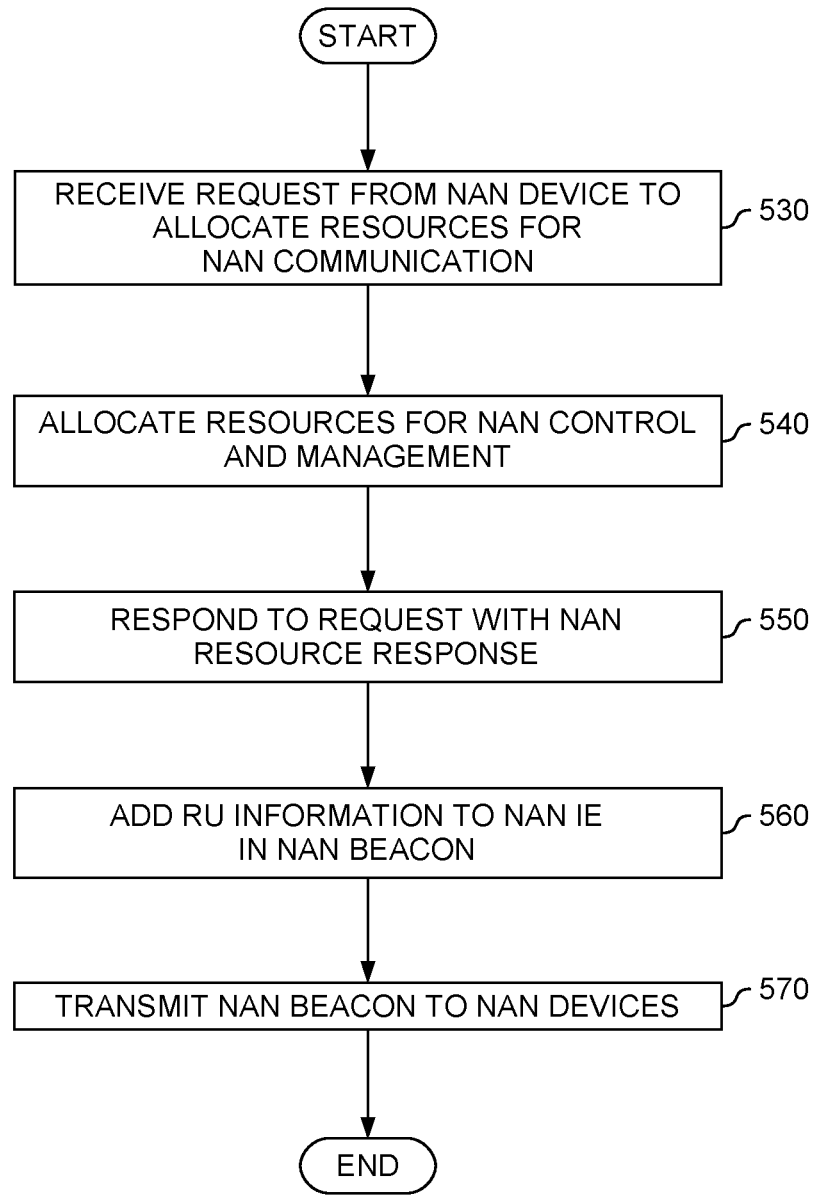

FIGS. 5A-5B further illustrate informing NAN devices of resource allocation using beacons, in an 802.11ax infrastructure-WLAN and NAN network, according to one embodiment described herein. In an embodiment, a NAN device that wants to start or join a NAN cluster and does not find any RU advertised by an AP for this purpose, may contact the AP and request an RU for this purpose. In an embodiment, the AP also starts informing other devices by advertising the RU in a beacon message.

As illustrated in FIG. 5A, a NAN device 522C in a NAN cluster 520 (e.g., an STA that uses NAN for D2D communication) can transmit a resource request 512 to an AP 510. In an embodiment, the NAN device 522C can transmit a NAN-Resource request to the AP 510. Alternatively, the NAN device 522C can transmit a WLAN probe request, and can include a NAN resource request within the WLAN probe request. For example, the NAN device 522C can transmit a WLAN probe request as part of normal infrastructure network communication, and can include in that WLAN probe request a NAN resource request. These are merely examples, and any suitable network message can be used.

The AP 510 can respond with a resource response 514. In an embodiment, the AP 510 can respond to the NAN device 522C with a NAN-Resource response. Alternatively, the AP 510 can respond to the NAN device 522A with a WLAN probe response, and can include a NAN resource response within the WLAN probe response. For example, the AP device 510 can transmit a WLAN probe response as part of normal infrastructure network communication, and can include in that WLAN probe response a NAN resource response. These are merely examples, and any suitable network message can be used.

In both situations, the response from the AP 510 to the NAN device 522C includes the RU to use for NAN control and management plane procedures. Further, the response may include an activation time for usage of the RU. In an embodiment, as discussed above, after transmitting the resource response 514, the AP can inform other devices (e.g., other NAN devices 522A-N) of the RU.

In an embodiment, the NAN devices 522A-N illustrated in FIG. 5A are STAs that are part of an infrastructure WLAN network that includes the AP 510. For example, the NAN devices 522A-N are in communication range of the AP 510. Further, the NAN devices 522A-N have NAN capabilities for D2D communication (e.g., within the NAN cluster 520).

FIG. 5B is a flowchart illustrating informing NAN devices of RU allocation, according to one embodiment described herein. At block 530, an AP (e.g., the AP 510 illustrated in FIG. 5A) receives a request (e.g., the resource request 512 illustrated in FIG. 5A) from a NAN device (e.g., the NAN device 522C illustrated in FIG. 5A) to allocate resources for NAN communication. At block 540, the AP allocates the resources to be used for NAN control and management plane procedures. In an embodiment, the AP assigns the RU. Alternatively, another suitable network component (e.g., a network controller) can assign the RU.

At block 550, the AP responds to the NAN device with a NAN resource response. As discussed above in relation to FIG. 5, this can be a new NAN-Resource response, can be included in an existing WLAN probe response, or can be any other suitable message indicating the resource allocation. At block 560, the AP adds the RU information (e.g., identifying the allocated RU) to a NAN IE in a NAN beacon. At block 570, the AP transmits the NAN beacon to NAN devices (e.g., one or more of the NAN devices 522A-N in the NAN cluster 520, illustrated in FIG. 5A). In an embodiment, the AP transmits the NAN beacon to NAN devices which did not send the initial NAN resource request (e.g., one or more of the NAN devices 522A, 522B, and 522N illustrated in FIG. 5A).

Figure 6:
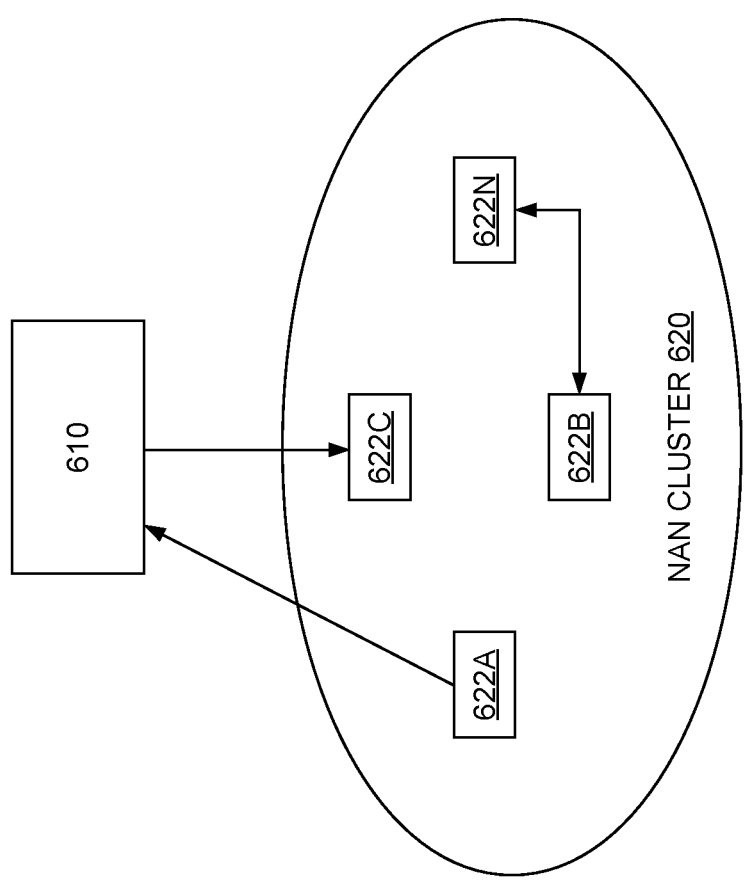
FIG. 6 illustrates data communication in an 802.11ax infrastructure-WLAN and NAN network, according to one embodiment described herein.

FIG. 6 illustrates data communication in an 802.11ax infrastructure-WLAN and NAN network, according to one embodiment described herein. In an embodiment, NAN devices in an 802.11ax infrastructure-WLAN and NAN network may communicate in two ways: indirectly, with an AP acting as an intermediary between two STAs, and directly, from one STA to another STA.

FIG. 6 illustrates both. For example, STA 622A in NAN cluster 620 communicates with STA 622C, also in NAN cluster 620, using AP 610. This is indirect communication. STA 622B and STA 622N, also both in NAN cluster 620, communicate without use of an AP. This is direct communication.

Figure 7B:
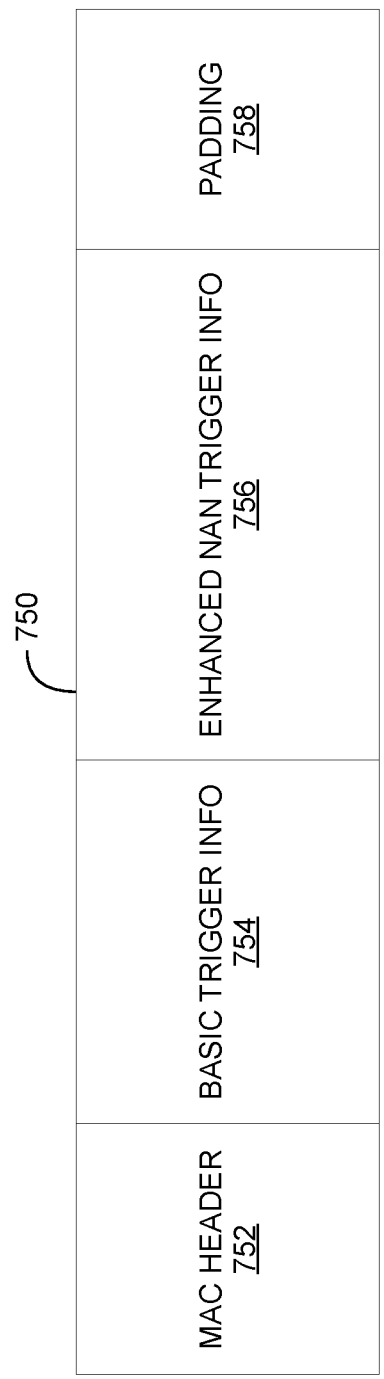

FIGS. 7A-7B illustrate a trigger in an 802.11ax infrastructure-WLAN and NAN network, according to one embodiment described herein. In an embodiment, a trigger frame is used from an AP to an STA in an 802.11ax network to indicate resources (such as RU) that a STA can use for uplink communication (i.e. for sending packets from STA to AP). For example, an AP can transmit a trigger frame to an STA, and the STA can use resources indicated in that trigger message to send uplink data.

FIG. 7A illustrates a trigger type subfield encoding for a trigger to facilitate direct STA to STA communication. This trigger can be referred to as a Trigger-NAN. In an embodiment, subfields 0-7 delineate standard existing trigger types. A reserved subfield value (e.g., 8-15) can be selected to delineate a Trigger-NAN. For example, a value of 8 in the trigger type subfield can delineate a Trigger-NAN.

FIG. 7B illustrates the composition of a trigger 750 in an 802.11ax infrastructure-WLAN and NAN network, according to one embodiment described herein. In an embodiment, the trigger 750 includes a MAC header 752 and basic trigger info 754. Both of these are known in existing triggers. In an embodiment, the MAC header 752 can include frame duration information, recipient address (RA) information, transmitting address (TA) information, and other suitable information as is known for 802.11ax triggers. In an embodiment, the basic trigger info 754 can include user information, ID information, RU information, and other suitable information as is known for 802.11ax triggers.

In an embodiment, the trigger 750 further includes enhanced NAN trigger info 756. In an embodiment, the enhanced NAN trigger info 756 facilitates direct STA-STA communication. For example, the enhanced NAN trigger info 756 can include ID information for STA pairs, allocated RU information, transmission power adjustment information, modulation and coding scheme (MCS) information, etc. For example, for a given pair of STAs selected for NAN communication, the enhanced NAN trigger info 756 may include ID information for each STA, allocated RU information, MCS information for the communication between the STAs, transaction power information indicating transaction power limits for the communication, and other suitable parameters. The trigger 750 further includes padding 758.

Figure 8:
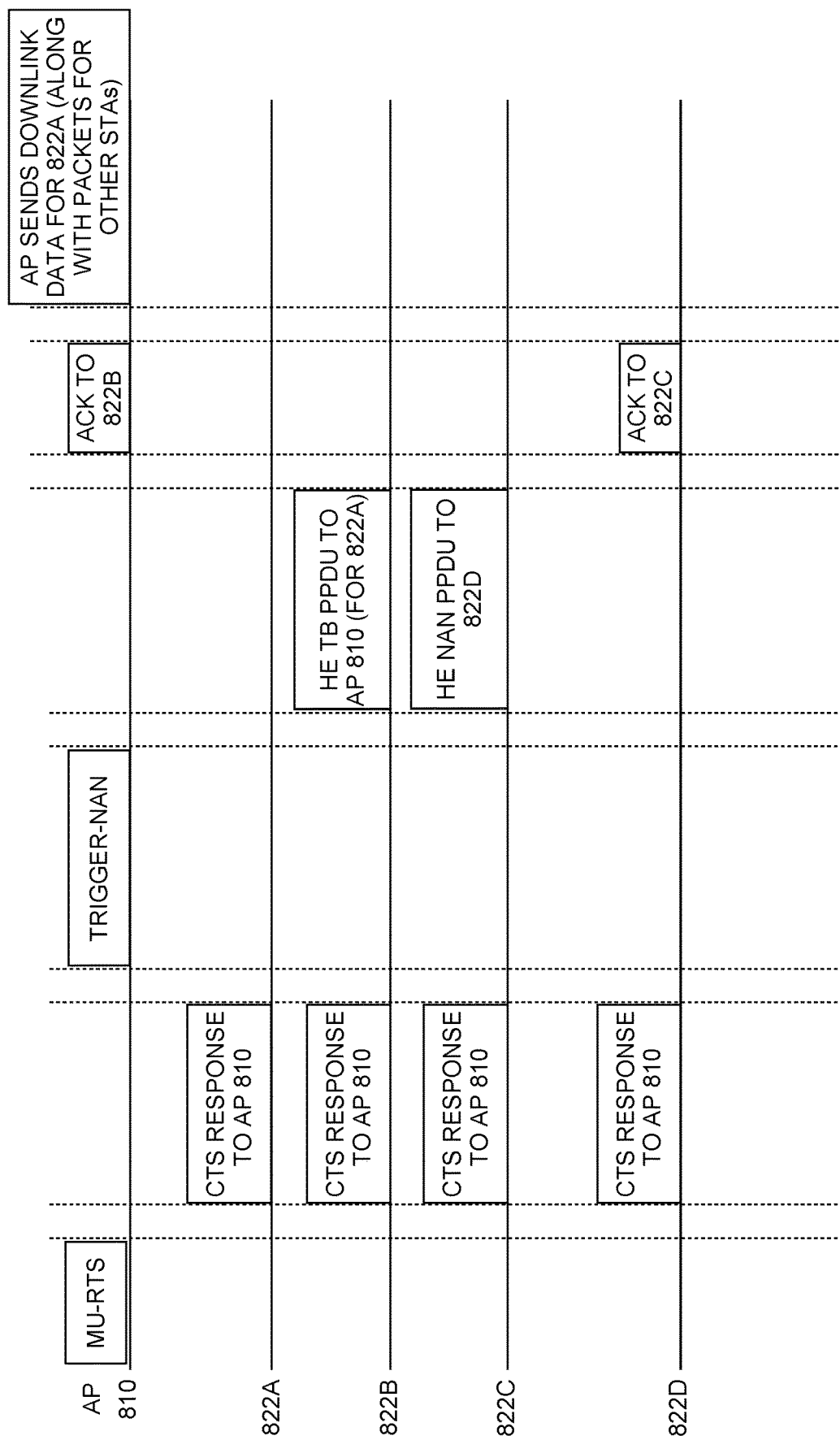
FIG. 8 further illustrates data communication in an 802.11ax infrastructure-WLAN and NAN network, according to one embodiment described herein.

FIG. 8 further illustrates data communication in an 802.11ax infrastructure-WLAN and NAN network, according to one embodiment described herein. In an embodiment, FIG. 8 illustrates both indirect communication between a first STA 822A and a second STA 822B using an AP 810, and direct communication between a third STA 822C and a fourth STA 822D. The AP 810 transmits a multi-user request to send (MU-RTS). The STAs 822A-D (or a subset of these STAs that have been contacted by the AP) respond with a clear to send (CTS) response to the AP 810.

The AP 810 then transmits a Trigger-NAN (e.g., as discussed above with regard to FIGS. 7A-7B). The STA 822B responds with a high efficiency (HE) trigger based (TB) physical layer convergence procedure (PLCP) protocol data unit (PPDU) to the AP 810. The STA 822C transmits an HE NAN PPDU to the STA 822D. The STA 822D responds with an acknowledgment to the STA 822C, and the AP 810 responds with an acknowledgment to the STA 822B. The AP also send downlink packet data to STA 822A that it received from the STA 822B (for the STA 822A).

Figure 9A:
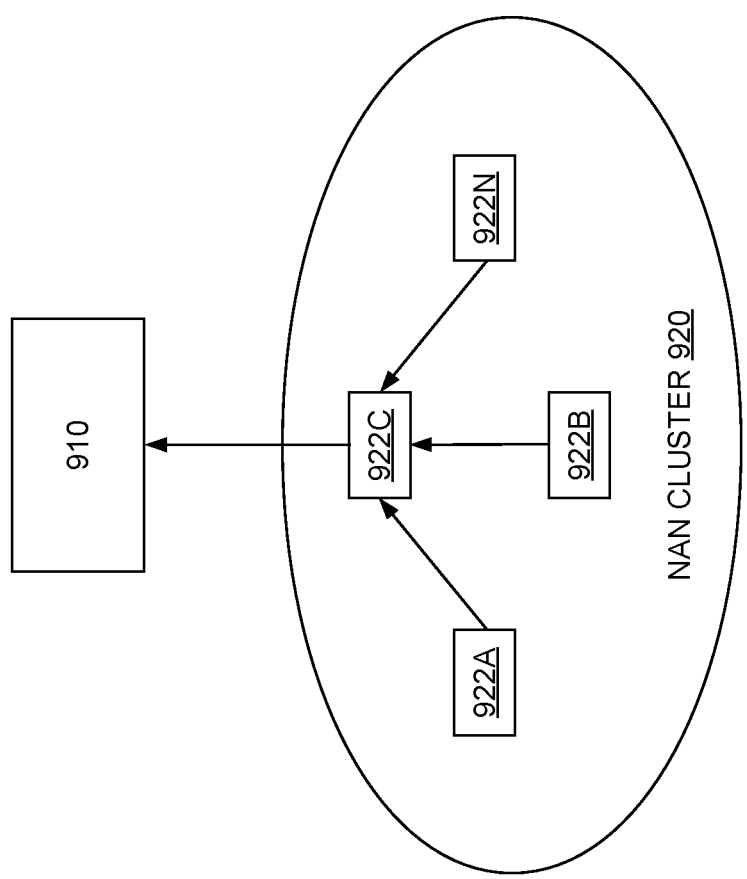
FIGS. 9A-9B illustrate buffer status reporting in an 802.11ax infrastructure-WLAN and NAN network, according to one embodiment described herein.
Figure 9B:
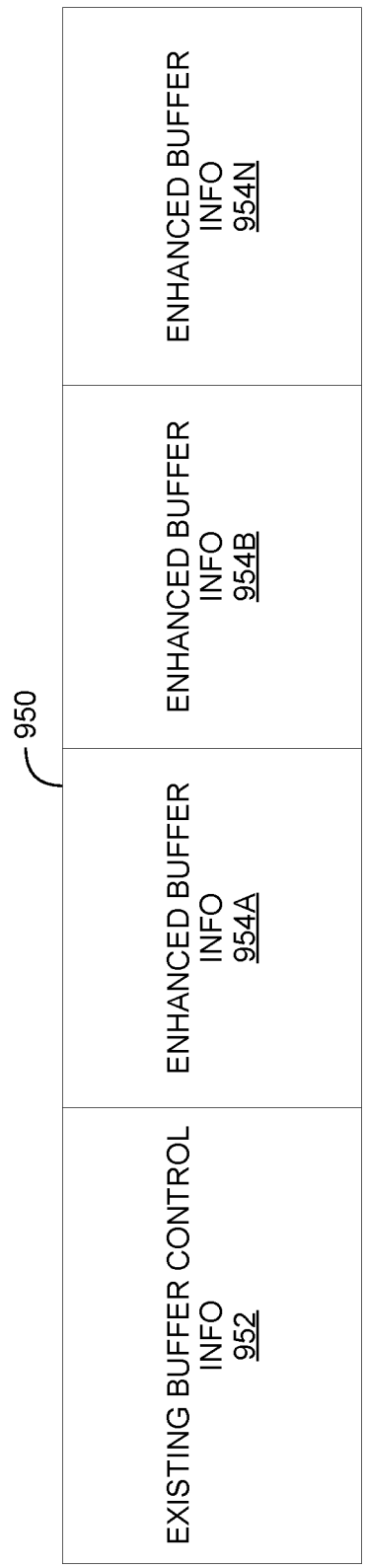

FIGS. 9A-9B illustrate buffer status reporting in an 802.11ax infrastructure-WLAN and NAN network, according to one embodiment described herein. In an embodiment, an infrastructure AP in a typical 802.11ax infrastructure network may get buffer status from STAs for packets pending in uplink queues at STAs, for STA to AP communication, using either unsolicited or solicited techniques. In a typical NAN network, however, an STA may have data destined for multiple other STAs. To facilitate an 802.11ax infrastructure-WLAN and NAN network, layer 2 protocols can be extended to allow a NAN STA to convey its buffer status of STA-STA queues to an AP.

In an embodiment, a given source NAN STA may indicate aggregate buffer length and/or buffer status, per Quality of Service (QoS) class, for each destination STA to which the source STA wants to send packets. In an embodiment, the number of destination STAs for which buffer length is indicated can be limited (e.g., to 1 or 2). This may help keep overhead low. Alternatively, providing buffer status for a larger number of destination STAs can provide for improved scheduling and resource management.

FIG. 9A illustrates aggregated buffer status reporting from a NAN STA to an AP, according to one embodiment described herein. For example, the STAs 922A, 922B, and 922N can provide buffer status to the STA 922C. The STA 922C can then provide the aggregated buffer status to an AP 910.

In an embodiment, a new trigger type can be used to facilitate aggregated buffer status reporting. This trigger can be referred to as a BSRP-NAN trigger (e.g., a buffer status report—neighbor awareness networking trigger). As discussed above with regard to FIG. 7A, in an embodiment, trigger subfields 0-7 delineate standard existing trigger types. A reserved subfield value (e.g., 8-15) can be selected to delineate a BSRP-NAN. For example, a value of 9 in the trigger type subfield can delineate a BS RP-NAN.

FIG. 9B illustrates a BSRP-NAN trigger 950. In an embodiment, a BSRP-NAN trigger can be used to communicate buffer status information (e.g., buffer-status per QoS class) for upload data pending in STA queues for an AP and for data pending in a NAN STA intended for other NAN STAs. The BSRP-NAN trigger 950 includes existing buffer control info 952 (e.g., as described in the 802.11ax specification).

The BSRP-NAN trigger 950 can further include enhanced buffer information fields 954A-N. In an embodiment, each enhanced buffer information field can correspond to a particular STA. The enhanced buffer information field can indicate the buffer status for packets pending in that STA's queue, intended for other NAN STAs.

Further, in an embodiment, an AP (e.g., the AP 910 illustrated in FIG. 9A) can schedule and allocate resources based on the buffer status information and other relevant parameters. For example, the AP can allocate resources for transmission by the STAs based on the buffer status information. In an embodiment, the AP can schedule resource allocation for data transmission between STAs (e.g., between the STAs in the NAN cluster 920 illustrated in FIG. 9A). In addition, or alternatively, the AP can schedule resource allocation for data transmission from the STAs to the AP. For example, the AP can give a relatively higher preference to STA->AP communication, as opposed to STA->STA communication, or vice versa (e.g., a higher preference to STA->STA communication, as opposed to STA->AP communication). Further, the AP can identify the communication path that has the most critical packets pending in the corresponding STA queues, and can prioritize that path.

In an embodiment, the AP can schedule and allocate resources by setting a "virtual" uplink parameter per STA. For example, this virtual uplink parameter can identify a prioritized communication link (e.g., from a given STA->AP, or between given STAs). This virtual uplink parameter can be determined based on numerous factors, as discussed above. The AP can then run its typical scheduling algorithm, using this virtual uplink parameter from each STA, to improve scheduling and resource allocation. For example, the AP can schedule NAN STA->NAN STA communication using a previously allocated RU, or using a newly allocated RU. In an embodiment, the AP allocates one RU per STA for data communication. Alternatively, the AP may allocate more than one RU per STA for data communication.

Figure 10A:
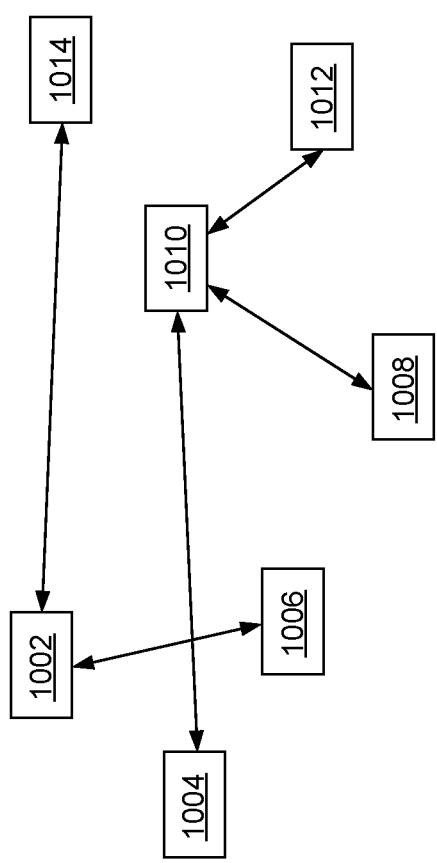
FIGS. 10A-10C illustrate resource allocation in a mixed infrastructure-WLAN, and NAN network, according to one embodiment described herein.
Figure 10B:
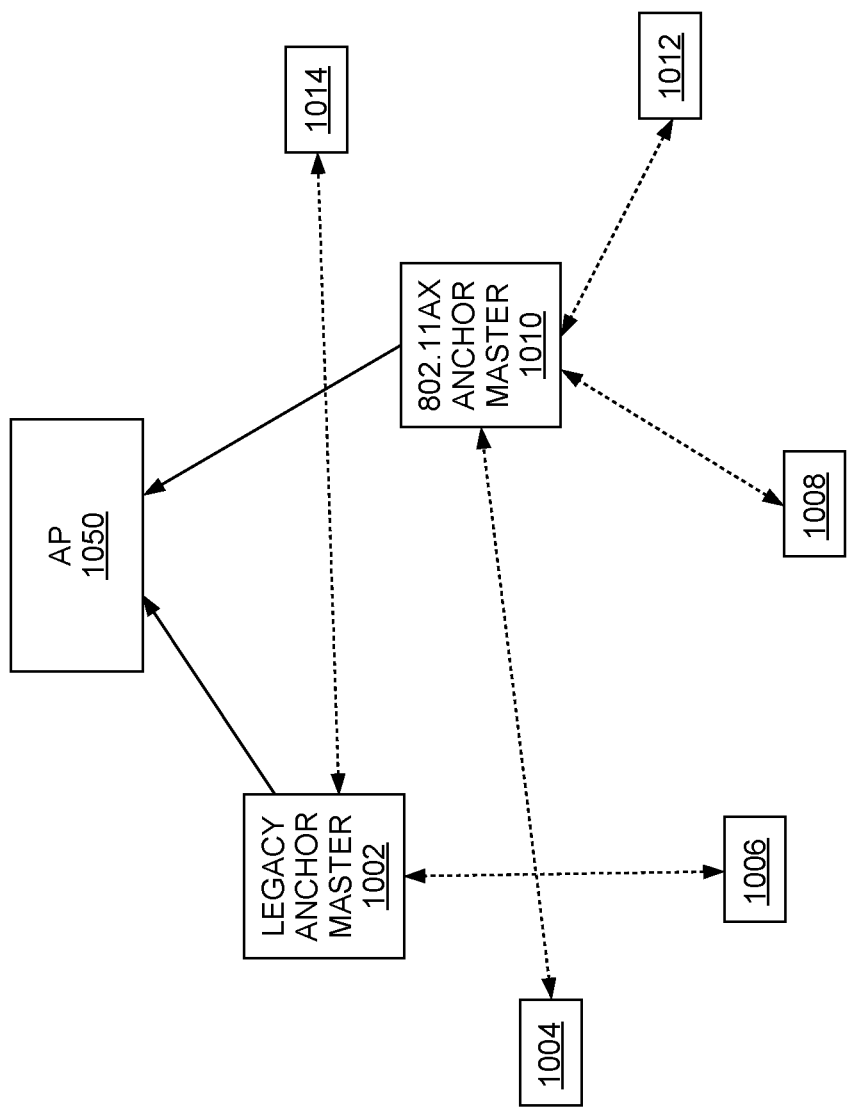
Figure 10C:
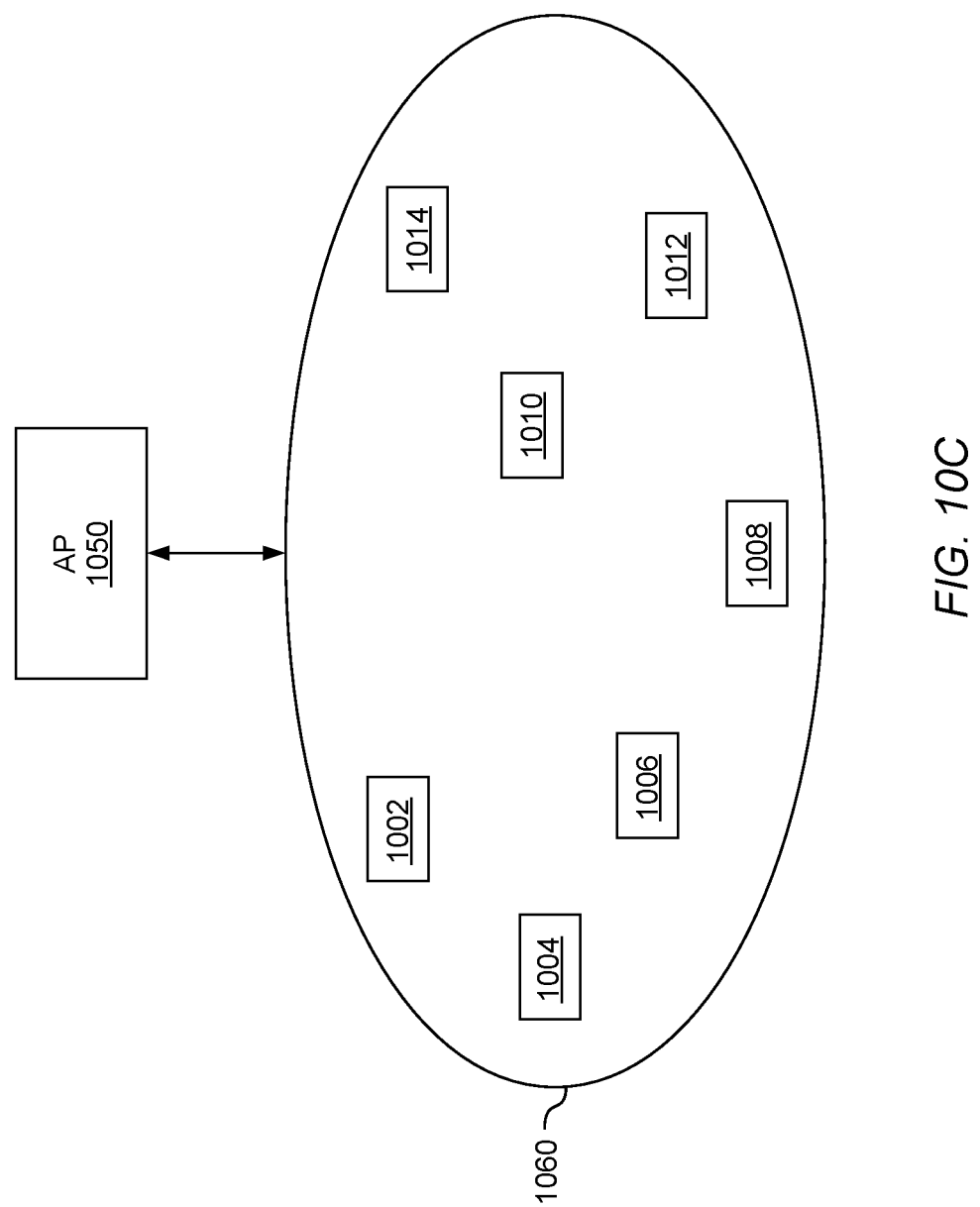

FIGS. 10A-10C illustrate resource allocation in a mixed infrastructure-WLAN, and NAN network, according to one embodiment described herein. As discussed above, in some circumstances each device in a network will support 802.11ax and later technologies (such as 802.11be). In other circumstances, some devices in the network will support 802.11ax (and later technologies), but other devices will only support older wireless standards (e.g., 802.11a/b/g/n/ac that are older than 802.11ax). These can be referred to as mixed networks.

In an embodiment, for communication between devices that each support 802.11ax and beyond, the techniques described above in connection with FIGS. 4-9 can be used. For communication between legacy devices that do not support 802.11ax, legacy STA communication techniques can be used. For example, a separate channel can be assigned for NAN communication. This is illustrated in FIG. 10A. As illustrated, a legacy device 1002 is in communication with legacy devices 1014 and 1006. These devices communicate using known legacy NAN techniques. An 802.11ax device 1010 is in communication with 802.11ax devices 1004, 1008, and 1012. These devices communicate using techniques as described above in FIGS. 4-9.

FIG. 10B illustrates an interim state in resource allocation for a mixed infrastructure-WLAN and NAN network, according to one embodiment described herein. The legacy devices 1002, 1014, and 1006 select the device 1002 to act as a legacy anchor master. The legacy anchor master 1002 communicates with legacy devices 1014 and 1006. The 802.11ax devices 1004, 1008, and 1012, select the 802.11ax device 1010 to act as the 802.11ax anchor master. The 802.11ax anchor master 1010 communicates with 802.11ax devices 1004, 1008, and 1012. An AP 1050 serves to facilitate resource allocation for the legacy and 802.11ax devices. The legacy anchor master 1002 and the 802.11ax anchor master 1010 act as interim anchor masters, and each contact the AP 1050. The AP 1050 then, as discussed below with regard to FIG. 10C, selects an overall anchor master, and merges the NAN clusters to form a combined cluster.

FIG. 10C illustrates an AP 1050 facilitating resource allocation for a NAN cluster 1060. As discussed above with regard to FIG. 10B, the interim legacy anchor master 1002 and the interim 802.11ax anchor master 1010 each contact the AP 1050. The AP 1050 then selects an overall anchor master for the combined NAN cluster 1060. In an embodiment, the AP 1050 can select any of the interim 802.11ax anchor master 1010, or the AP 1050 itself, to act as the anchor master. The chosen anchor master for the NAN cluster 1060 then communicates using both 802.11ax techniques (e.g., selecting resource units) and legacy technologies (e.g., using a dedicated NAN channel).

Figure 11:
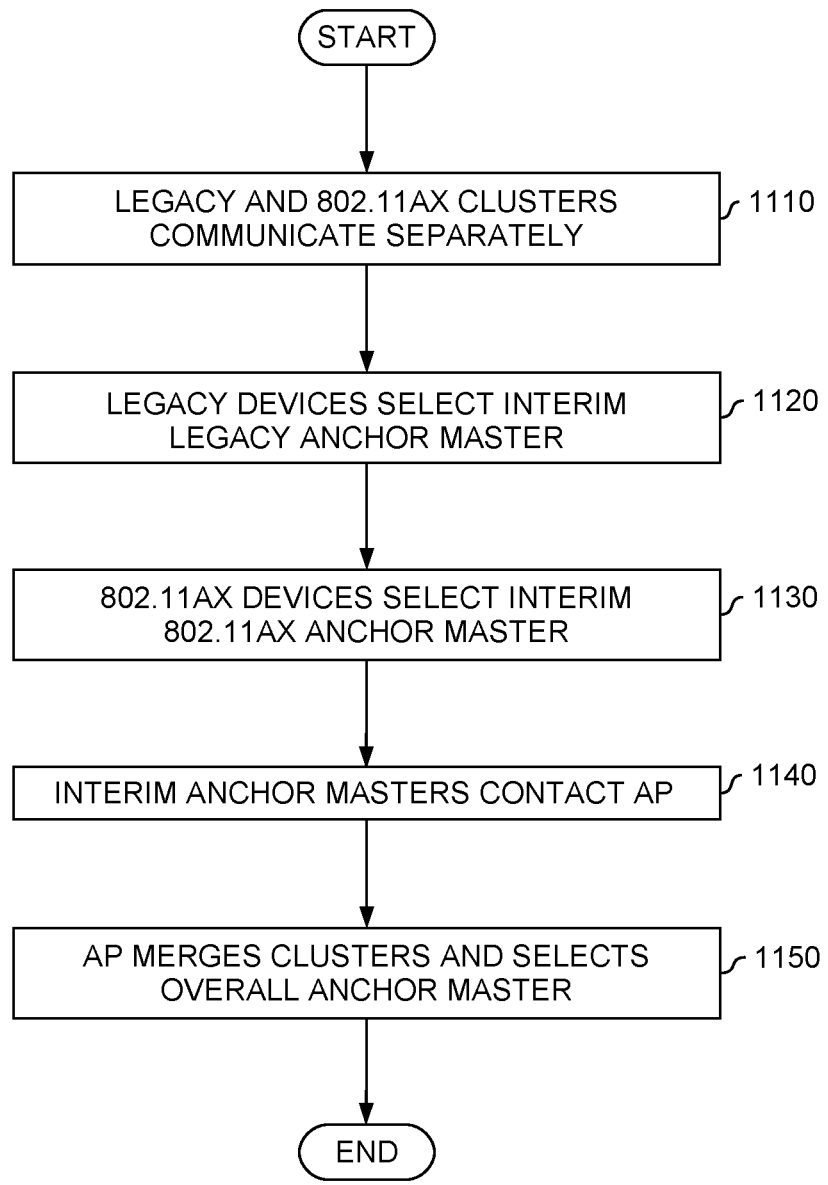
FIG. 11 is a flowchart illustrating resource allocation in a mixed infrastructure-WLAN and NAN network, according to one embodiment described herein.

FIG. 11 is a flowchart illustrating resource allocation in a mixed infrastructure-WLAN and NAN network, according to one embodiment described herein. At block 1110, legacy and 802.11ax NAN clusters communicate separately. As discussed above with regard to FIG. 10A, legacy devices (e.g., legacy devices 1002, 1014, and 1006) communicate with each other as part of a NAN cluster. 802.11ax devices (e.g., 802.11ax devices 1004, 1010, 1008, and 1012) separately communicate with each other as part of a separate NAN cluster.

At block 1120, the legacy devices select an interim legacy anchor master. For example, as illustrated in FIG. 10B, the legacy devices 1002, 1014, and 1006 select the legacy device 1002 to act as an interim legacy anchor master. At block 1130, the 802.11ax devices select an interim 802.11ax anchor master. For example, as illustrated In FIG. 10B, the 802.11ax devices 1004, 1010, 1008, and 1012 select the 802.11ax device 1010 to act as the interim 802.11ax anchor master.

At block 1140, the interim anchor masters contact an AP. For example, as illustrated in FIG. 10B, the interim legacy anchor master 1002 and the interim 802.11ax anchor master 1010 each contact the AP 1050. At block 1150, the AP merges the NAN clusters and selects an overall anchor master. As illustrated in FIG. 10C, the AP 1050 merges the devices 1002, 1004, 1006, 1008, 1010, 1012, and 1014 into a NAN cluster 1060 and selects an overall anchor master. As discussed above, in an embodiment, the overall anchor master can be any of the interim 802.11ax anchor master 1010, or the AP 1050.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for routing data in a wireless communication network comprising a hybrid of infrastructure wireless local area network (WLAN) and neighbor awareness networking (NAN), the method comprising:
   allocating, by an access point (AP), at least one radio sub-channel for NAN data transmission in the wireless communication network; and
   transmitting a NAN beacon that identifies the allocated radio sub-channel from the AP to a first NAN device, wherein the first NAN device is configured to transmit a NAN network message to a second NAN device using the allocated radio sub-channel based on receiving the NAN beacon.

2. The method of claim 1, wherein the radio sub-channel comprises an Orthogonal Frequency-Division Multiple Access (OFDMA) Resource Unit (RU).

3. The method of claim 2, wherein the NAN network message comprises one of: a NAN discovery beacon, a NAN sync beacon, or a NAN service discovery beacon.

4. The method of claim 1, wherein the NAN beacon comprises a NAN information element (IE) identifying the allocated radio sub-channel.

5. The method of claim 1, further comprising:
   receiving, at the AP, a request network message from a third NAN device for radio sub-channel allocation, and in response transmitting to the third NAN device a response network message identifying the allocated radio sub-channel.

6. The method of claim 5, wherein the request network message comprises a NAN resource-request and wherein the response network message comprises a NAN resource-response.

7. The method of claim 5, wherein the request network message comprises a WLAN probe-request and wherein the response network message comprises a WLAN probe-response.

8. The method of claim 1, further comprising:
   transmitting from the AP to a third NAN device a trigger frame identifying NAN communication information.

9. The method of claim 8, wherein the NAN communication information comprises at least one of: (i) one or more identifiers relating to the third NAN device and a fourth NAN device, (ii) information identifying the allocated radio sub-channel, (iii) transmission power adjustment information, and (iv) modulation and coding scheme (MCS) information, and
   wherein the third NAN device is configured to transmit data to the fourth NAN device based on the trigger frame.

10. The method of claim 8, wherein the NAN communication information comprises buffer status information relating to at least one of the third NAN device and a fourth NAN device, and
    wherein the third NAN device is configured to transmit data to at least one of the AP or the fourth NAN device, based on the trigger frame.

11. The method of claim 1, wherein the wireless communication network comprises a first set of devices that support communication using radio sub-channels and a second set of devices that do not support communication using radio sub-channels, wherein the AP allocates the radio sub-channel for the first set of devices, and wherein the AP facilitates network communication for both the first set of devices and the second set of devices.

12. A computer program product for routing data in a wireless communication network comprising a hybrid of infrastructure wireless local area network (WLAN) and neighbor awareness networking (NAN), the computer program product comprising:
   a computer-readable storage medium having computer-readable program code embodied therewith, the computer-readable program code executable by one or more computer processors to perform an operation, the operation comprising:
      allocating, by an access point (AP), at least one radio sub-channel for NAN data transmission in the wireless communication network; and
      transmitting a NAN beacon that identifies the allocated radio sub-channel from the AP to a first NAN device, wherein the first NAN device is configured to transmit a NAN network message to a second NAN device using the allocated radio sub-channel based on receiving the NAN beacon.

13. The computer program product of claim 12, wherein the radio sub-channel comprises an Orthogonal Frequency-Division Multiple Access (OFDMA) Resource Unit (RU) and wherein the NAN network message comprises one of: a NAN discovery beacon, a NAN sync beacon, or a NAN service discovery beacon.

14. The computer program product of claim 12, wherein the NAN beacon comprises a NAN information element (IE) identifying the allocated radio sub-channel.

15. The computer program product of claim 12, the operation further comprising:
 transmitting from the AP to a third NAN device a trigger frame identifying NAN communication information,
 wherein the NAN communication information comprises at least one of: (i) one or more identifiers relating to the third NAN device and a fourth NAN device, (ii) information identifying the allocated radio sub-channel, (iii) transmission power adjustment information, (iv) modulation and coding scheme (MCS) information, and (v) buffer status information relating to at least one of the third NAN device and a fourth NAN device.

16. A system, comprising:
 a processor; and
 a memory storing a program, which, when executed on the processor, performs an operation, the operation comprising:
  allocating, by an access point (AP), at least one radio sub-channel for NAN data transmission in a wireless communication network; and
  transmitting a NAN beacon that identifies the allocated radio sub-channel from the AP to a first NAN device, wherein the first NAN device is configured to transmit a NAN network message to a second NAN device using the allocated radio sub-channel based on receiving the NAN beacon.

17. The system of claim 16, wherein the radio sub-channel comprises an Orthogonal Frequency-Division Multiple Access (OFDMA) Resource Unit (RU).

18. The system of claim 17, wherein the NAN network message comprises one of: a NAN discovery beacon, a NAN sync beacon, or a NAN service discovery beacon.

19. The system of claim 16, wherein the NAN beacon comprises a NAN information element (IE) identifying the allocated radio sub-channel.

20. The system of claim 16, the operation further comprising:
 transmitting from the AP to a third NAN device a trigger frame identifying NAN communication information,
 wherein the NAN communication information comprises at least one of: (i) one or more identifiers relating to the third NAN device and a fourth NAN device, (ii) information identifying the allocated radio sub-channel, (iii) transmission power adjustment information, (iv) modulation and coding scheme (MCS) information, and (v) buffer status information relating to at least one of the third NAN device and a fourth NAN device.

* * * * *